United States Patent

Bain et al.

[15] 3,635,480
[45] Jan. 18, 1972

[54] SEALED JOINT AND GASKET THEREFOR

[72] Inventors: Orville J. Bain, Culver City; Jerry G. Jelinek, Whittier, both of Calif.

[73] Assignee: Parker-Hannifin Corporation, Cleveland, Ohio

[22] Filed: June 4, 1970

[21] Appl. No.: 43,455

[52] U.S. Cl. .............................. 277/180, 277/211, 277/235 B
[51] Int. Cl. ....................................... F16j 15/08, F16j 15/10
[58] Field of Search ...................... 277/180, 211, 235, 235 B

[56] References Cited

UNITED STATES PATENTS

| | | | |
|---|---|---|---|
| 3,355,181 | 11/1967 | Olson | 277/180 |
| 3,448,986 | 6/1969 | Jelinek et al. | 277/180 |
| 3,519,279 | 7/1970 | Wagner | 277/180 X |

*Primary Examiner*—Samuel B. Rothberg
*Attorney*—John N. Wolfram

[57] ABSTRACT

A joint and gasket in which one of a pair of parts to be sealed has a recess surrounded by a clamping face, the gasket has a resilient member to snugly fit into and fill the recess and has a metal plate embedded in the resilient member, the plate having a flat exposed portion to be clamped between the two parts. The resilient member has a relatively wide buffer portion adjacent the flat plate portion and has a sealing portion inwardly of the buffer portion. The sealing portion initially extends axially beyond the buffer portion whereby when the parts are brought together to clamp the plate, the sealing portion is deformed into tight sealing engagement with the parts and the buffer portion remains substantially undeformed and unstressed. The plate is connected to the resilient member by embedding a conical portion of the plate therein and preferably the conical portion has a reverse bend at its free end to enhance the connection and has circumferentially spaced holes therethrough to permit resilient material on both sides of the conical portion to be integrally connected through the holes.

11 Claims, 6 Drawing Figures

PATENTED JAN 18 1972

3,635,480

INVENTORS
ORVILLE J. BAIN
JERRY G. JELINEK
BY
John N. Wolfram
ATTORNEY

SEALED JOINT AND GASKET THEREFOR

BACKGROUND OF THE INVENTION

This invention is an improvement in the disclosure of U.S. Pat. No. 3,448,986 which shows a generally similar gasket having a resilient member attached to a flat plate that is clamped between two parts to be sealed. The resilient member has a sealing portion that is deformed and stressed into sealing engagement with the parts. One end of the deformed portion is closely adjacent the clamped portion of the plate and fluid pressure within the parts acts on the deformed portion tending to extrude it between the plate and the one part when fluid pressure causes slight separation of the parts to be sealed. Because the deformed portion is already stressed from the makeup of the parts, it has much less resistance to extrusion or breakdown under such fluid pressure action than if it were not stressed.

SUMMARY OF THE INVENTION

The present invention improves the life and extrusion resistance of the resilient seal member by providing a relatively undeformed and unstressed buffer portion of significant proportions between the deformed sealing portion and the clearance or separation where extrusion might otherwise occur. The invention also provides a method of attaching the plate to the resilient member that comprises a conical section of the plate embedded within the resilient member, the conical section being in the buffer portion and preferably having a reverse curl for more secure anchoring.

DESCRIPTION

Figure 1:
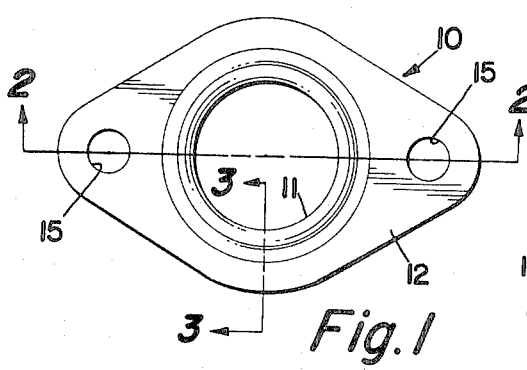
FIG. 1 is a top view of the gasket.
Figure 2:
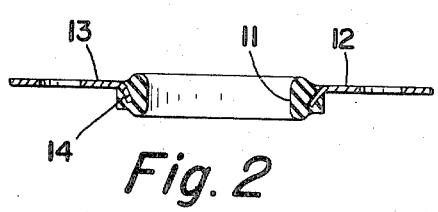
FIG. 2 is a section view on line 2—2 of FIG. 1.

Gasket 10 may be of any desired configuration in top view outline, a typical outline being shown in FIG. 1. It includes a resilient member 11 of synthetic rubber, silicone, or other elastomeric material attached to a plate 12 of rigid material such as metal or hard plastic. The plate has an outer flat exposed portion 13 and an inner conical embedded portion 14 that extends downward at an angle of about 15° to the longitudinal axis of the gasket.

Figure 3:
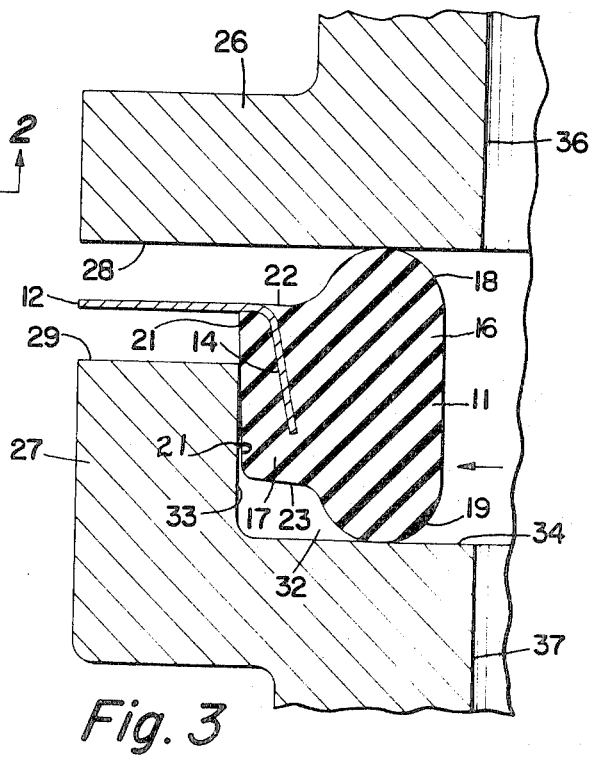
FIG. 3 is an enlarged fragmentary section of the gasket on line 3—3 of FIG. 1 and showing the gasket and the parts to be sealed in loose assembled position.

As more clearly shown in FIG. 3 in which the resilient member 11 is in its initial or undeformed condition, the resilient member has a sealing portion 16 and a buffer portion 17. The sealing portion has rounded ends 18 and 19 that project axially beyond buffer portion 17. The latter is of substantial radial thickness, such thickness being at least one-half of the radial thickness of sealing portion 16. The outer circumferential face 21 of buffer portion 17 is tapered on the order of 3° to 5° for easy insertion in a part to be sealed and the end faces 22, 23 are substantially at right angles to the longitudinal axis of the gasket. Face 22 is substantially coplanar with the upper face of exposed portion 13 of plate 12. Conical portion 14 is preferably completely retained within buffer portion 17 whereby sealing portion 16 may readily deform as required for its sealing function.

The gasket may be used for sealing the joint between a pair of pipe or housing flanges 26, 27. Flange 26 has a flat face 28 and flange 27 has a flat face 29 with a recess 32 therein that has a radial wall 33 and a bottom wall 34. The flanges have central passageways 36, 37 for conveying fluid.

Figure 4:
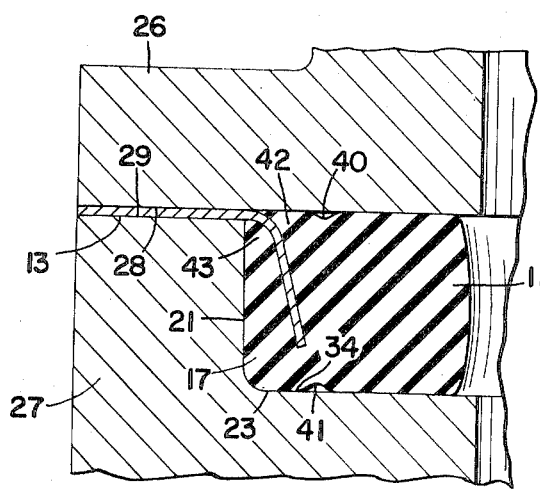
FIG. 4 is a view similar to FIG. 3 showing the parts in tightly assembled position.
Figure 5:
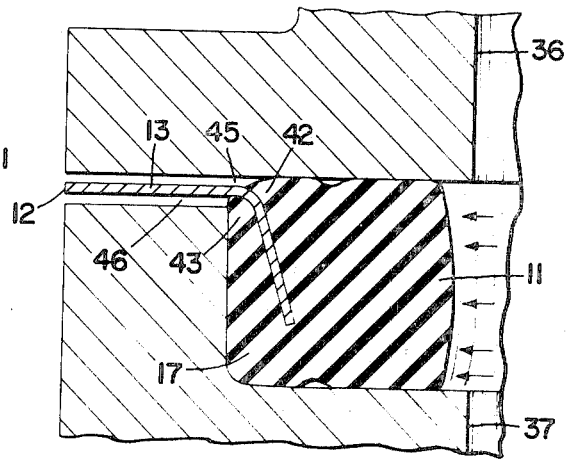
FIG. 5 is a view like FIG. 4 but showing slight separation of the parts being sealed.

To make up the joint, gasket 10 is assembled to flange 27 by inserting the resilient member 11 into recess 32 until rounded portion 19 lightly engages wall 34. Flange 26 is then brought into position with flat face 28 lightly engaging rounded end 18 of the resilient member. The flanges are then brought toward each other by bolts (not shown) that pass through bolt holes 15 in plate 12. This causes sealing portion 11 to deform and for rounded ends 18 and 19 to be pressed into tight sealing engagement with the flanges. When the joint is fully made up it will appear as shown in FIG. 4 with the exposed portion 13 of the plate tightly clamped between flange surfaces 28 and 29 and with sealing portion 11 substantially deformed. Such deformation results in substantial internal stress in the material of the sealing portion.

As the joint is made up, buffer portion 17 undergoes very little deformation. The lower face 23 comes into light contact with recess bottom wall 34 and there is a slight expansion at the outer diameter 21 so as to substantially fill the portion of recess 32 in which the buffer portion 17 is contained. Because of the considerable deformation of rounded ends 18 and 19, there are usually slight depressions 40 and 41 on the opposite faces of the resilient member between the sealing portion 11 and the buffer portion 17. Thus, the buffer portion, and particularly in the regions indicated by numerals 42, 43 remains relatively undeformed and unstressed.

When fluid pressure is applied within passages 36, 37, it may result in a slight stretching of the bolts holding the flanges together whereby the flanges may separate slightly so as to create slight clearances 45, 46 on either side of flat portion 13 of plate 12. Fluid pressure within the gasket pushes radially outwardly on sealing portion 11. If the sealing portion were located adjacent clearances 45, 46 it would not offer much resistance to breakdown and/or extrusion into the clearance because of its highly stressed condition from makeup of the joint. The outward pressure of the fluid upon the sealing portion 11 is transmitted to the buffer portion 17 and because the latter is in an unstressed condition prior to the application of fluid pressure, the buffer portion affords considerable resistance to deformation and stressing that would otherwise breakdown or extrude the resilient material into clearances 45, 46. Moreover, conical portion 14, because of its small angle and the fact that it extends through a major portion of the axial length of the buffer portion 17, absorbs most of the radial outward thrust imposed on the resilient member by fluid pressure and thus protects region 43 from appreciable deformation and stress formation.

Figure 6:
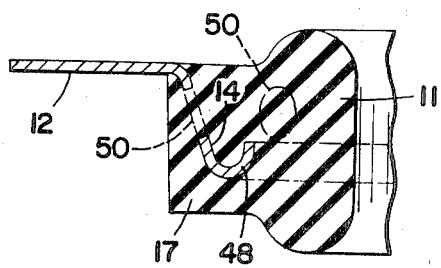
FIG. 6 is a fragmentary section view of the gasket showing an alternate construction for anchoring the plate to the resilient member.

In the form of the gasket illustrated in FIG. 6, the lower end of conical portion 14 of plate 12 has reverse bend 48 for enhancing the grip of the plate upon the resilient member. The curled-up portion 48 may be directed directly upwardly, as shown, or it may be curled to a somewhat lesser or greater extent, as desired. The curled portion 48 also strengthens the conical portion of the plate so as to effectively resist diametral expansion of the same so as to avoid significant radial compression of that portion of the resilient material that is radially outward of the conical portion 14 by fluid pressure acting radially outward on sealing portion 16. This further avoids stressing of the resilient material in the region 43 to help minimize the possibility of extrusion or failure in this region.

Also as illustrated in FIG. 6, conical portion 14 may have therein a series of circumferentially spaced circular openings 50 therethrough through which resilient material that is integral with the resilient material on the radial inner and outer sides of conical portion 14 extends. Such openings 50 may be provided in the other form of the invention as well.

We claim:

1. A gasket comprising a plate of rigid material and an elastomeric member, the elastomeric member having a sealing portion and a buffer portion, the plate having a flat exposed portion and another portion that is embedded solely in the buffer portion, the buffer portion extending generally axially only in one direction from the plane at the exposed portion.

2. The gasket of claim 1 in which one end of the buffer portion is substantially flat and coplanar with said plate exposed portion and the other end is flat and axially offset from said plate exposed portion.

3. The gasket of claim 1 in which said embedded plate portion extends at an angle of approximately 15° to the longitudinal axis of the gasket so as to traverse the buffer portion in both axial and radial directions.

4. The gasket of claim 1 in which the radial width of the buffer portion is more than one-half the radial thickness of the sealing portion and the radial outer face of the buffer portion is substantially cylindrical and is exposed throughout the greater part of its length.

5. A gasket comprising a plate of rigid material and an elastomeric member, the elastomeric member having adjacent contiguous annular sealing and buffer portions, the sealing portion extending axially beyond one end of the buffer portion, said one end of the buffer portion being substantially coplanar with and immediately adjacent an exposed flat portion of said plate, and said plate having a portion embedded within said buffer portion, said plate being substantially thinner than the axial thickness of said buffer portion.

6. The gasket of claim 5 in which the embedded portion is completely within the buffer portion.

7. A joint comprising a first part having an annular recess with a radial wall and having a clamping face adjacent said wall, a second part having a clamping face opposite the first-mentioned clamping face and having a surface opposite said recess, a gasket having a resilient member within said recess and having a rigid member with a flat portion between said clamping faces, the gasket having a sealing portion in contact with said surface and the bottom of said recess and having a buffer portion between the sealing portion and the flat portion, said member having another portion embedded within said buffer portion, said sealing portion initially extending axially beyond both ends of said buffer portion and being substantially deformed and stressed by contact with said surface and the recess bottom wall when the joint is made tight, and the axial length of said buffer portion being substantially the same as the depth of the recess whereby said buffer portion is substantially undeformed and unstressed when the joint is made tight.

8. The joint of claim 7 in which the buffer portion substantially completely fills the recess between the sealing portion and said radial wall when the joint is tight.

9. The joint of claim 7 in which the ends of the sealing portion are rounded and extend axially beyond both ends of the buffer portion, and the ends of the buffer portion merge with the rounded ends and are substantially normal to the longitudinal axis of the gasket.

10. A gasket comprising a plate of rigid material and an elastomeric member having a buffer portion and sealing portion, the plate having an exposed portion and another portion that is embedded solely in the buffer portion and extends generally axially therein, the embedded portion having a reinforcement that resists radial expansion by force applied thereto by fluid pressure acting on the sealing portion located radially inward of the embedded portion of the plate.

11. The gasket of claim 10 in which the embedded portion is of uniform thickness and the reinforcement comprises a section of the embedded portion that is curled toward the sealing portion.

* * * * *